(12) United States Patent
Iwai et al.

(10) Patent No.: US 7,446,137 B2
(45) Date of Patent: Nov. 4, 2008

(54) THERMOSETTING RESIN AND THIOCYANATO-CONTAINING ORGANOHYDROCARBONOXYSILANE

(75) Inventors: Makoto Iwai, Chiba Prefecture (JP); Keiji Wakita, Chiba Prefecture (JP); Akihiko Shirahata, Chiba Prefecture (JP)

(73) Assignee: Dow Corning Toray Silicone Co., Ltd., Tokyo (JP)

( * ) Notice: Subject to any disclaimer, the term of this patent is extended or adjusted under 35 U.S.C. 154(b) by 421 days.

(21) Appl. No.: 10/492,622

(22) PCT Filed: Oct. 29, 2002

(86) PCT No.: PCT/JP02/11246

§ 371 (c)(1), (2), (4) Date: Apr. 20, 2004

(87) PCT Pub. No.: WO03/037976

PCT Pub. Date: May 8, 2003

(65) Prior Publication Data

US 2004/0249090 A1  Dec. 9, 2004

(30) Foreign Application Priority Data

Oct. 29, 2001 (JP) ............... 2001-330914

(51) Int. Cl.
*B32B 15/00* (2006.01)
*B32B 27/18* (2006.01)
*B32B 27/38* (2006.01)
*B32B 27/42* (2006.01)
*C08K 5/5419* (2006.01)
*C08L 61/10* (2006.01)
*C08L 63/00* (2006.01)
*C08L 63/04* (2006.01)
*C08L 79/08* (2006.01)

(52) U.S. Cl. ........... 523/453; 428/413; 428/414; 428/416; 428/418; 428/426; 428/429; 428/430; 428/435; 428/436; 428/447; 428/448; 428/450; 428/457; 428/458; 428/460; 428/473.5; 428/480; 428/524; 428/688; 524/262; 524/588; 524/592; 524/593; 524/594; 524/597; 524/601; 524/606; 524/612

(58) Field of Classification Search ............. None
See application file for complete search history.

(56) References Cited

U.S. PATENT DOCUMENTS

| 3,957,718 | A | | 5/1976 | Pochert et al. |
| 4,524,169 | A | | 6/1985 | Wolff et al. |
| 5,219,963 | A | * | 6/1993 | Goerl et al. ............. 526/227 |
| 6,172,157 | B1 | * | 1/2001 | Araki et al. ............. 524/506 |
| 6,867,319 | B2 | * | 3/2005 | Wakita ................. 556/429 |

FOREIGN PATENT DOCUMENTS

| GB | 2259303 | A | * | 3/1993 |
| JP | 63-309566 | | | 12/1988 |
| JP | 63309566 | A | * | 12/1988 |
| JP | 2-185585 | | | 7/1990 |
| JP | 02185585 | A | * | 7/1990 |
| JP | 4-277534 | | | 10/1992 |
| JP | 5-214171 | | | 8/1993 |

OTHER PUBLICATIONS

Hawley's Condensed Chemical Dictionary, Van Nostrand Reinhold Company, New York, New York, 1971, p. 865.*
Derwent accession No. 1992-235284 for Japanese Patent No. 4-277534, Goerl et al., Oct. 2, 1992, one page.*
Derwent accesion No. 1993-078992 for Japanese Patent No. 5-214171, Gorl et al., Aug. 24, 1993, one page.*

* cited by examiner

*Primary Examiner*—Robert Sellers
(74) *Attorney, Agent, or Firm*—Howard & Howard Attorneys, P.C.

(57) ABSTRACT

A curable organic resin composition comprising (A) 100 parts by weight of a curable organic resin and (B) 0.01 to 100 parts by weight of a thiocyanato-containing organohydrocarbonoxysilane or an isothiocyanato-containing organohydrocarbonoxysilane represented by the general formula: $X—R^1—Si(OR^2)nR^3_{3-n}$, wherein X is NCS— or SCN—, $R^1$ is an alkylene or alkyleneoxyalkylene group, $R^2$ and $R^3$ are monovalent hydrocarbon groups, and the subscript n is 1, 2, or 3. The curable organic resin composition possesses superior moldability and, when cured, exhibits superior adhesive properties on substrates such as metals.

16 Claims, No Drawings

THERMOSETTING RESIN AND THIOCYANATO-CONTAINING ORGANOHYDROCARBONOXYSILANE

The present invention relates to a thermosetting organic resin composition, and, more specifically, to a thermosetting organic resin composition possessing superior moldability and, when cured, exhibiting superior adhesive properties on substrates such as metals.

It is known that compounding epoxy-containing organosilanes, amine-containing organoalkoxysilanes or mercapto-containing organoalkoxysilanes with epoxy resins improves their adhesive properties. For instance, Japanese Patent Application Publication (Kokai) No. Sho 63-309566 teaches coating material compositions with improved adhesive properties obtained by compounding silane coupling agents such as 3-glycidoxypropylmethyldiethoxysilane, N-phenyl-3-aminutesopropyltrimethoxysilane, and 3-mercaptopropyltrimethoxysilane with epoxy resin powder coating materials.

Also, Japanese Patent Application Publication (Kokai) No. Hei 2-185584 teaches an adhesive agent composition obtained by compounding 3-mercaptopropyltrimethoxysilane with an epoxy resin. However, adhesive properties of the compositions obtained by the addition of epoxy-containing alkoxysilanes are not necessarily sufficient for substrates such as metals, etc., and, depending on the intended use, such compositions may not be suitable. Furthermore, the original curability of the epoxy resins is significantly impaired in compositions obtained by adding amine-containing organoalkoxysilanes or mercapto-containing organoalkoxysilanes.

On the other hand, there are also known thiocyanato-containing organoalkoxysilanes and organic rubber compositions containing said thiocyanato-containing organoalkoxysilanes. For instance, Japanese Patent Application Publication (Kokai) No. Hei 4-277534 teaches compositions obtained by compounding ethylene-propylene-diene rubber (EPDM) with thiocyanatopropyltrimethoxysilane. After vulcanization in the presence of organic peroxides, such compositions are said to produce rubber moldings exhibiting very little deterioration in physical properties and a small compression set.

In addition, Japanese Patent Application Publication (Kokai) No. Hei 5-214171 teaches vulcanizable organic rubber compositions obtained by compounding thiocyanatopropyltrimethoxysilane with vulcanizable organic rubbers, such as natural rubber (NR), styrene-butadiene rubber (SBR), EPDM, etc. When vulcanized in the presence of sulfur, these compositions are said to produce rubber moldings exhibiting little deterioration in physical properties.

However, there are no known thermosetting organic resin compositions, in which the addition of a thiocyanato-containing organoalkoxysilane to thermosetting organic resins improves the moldability of said organic resin and its adhesive properties on substrates such as metals with which said thermosetting organic resin composition has contacted.

As a result of strenuous efforts, the inventors of the present invention have discovered that the above-described problems are solved if epoxy resins are compounded with a thiocyanato-containing organoalkoxysilane. Furthermore, they have discovered that compounding a thiocyanato-containing organoalkoxysilane with thermosetting organic resins, such as phenolic resins, imide resins, etc., results in an improvement in their adhesive properties.

It is an object of the present invention to provide a thermosetting organic resin composition having superior moldability that cures without impairing the curability of the thermosetting organic resin itself and, when cured, exhibits superior adhesive properties on substrates such as metals with which said thermosetting organic resin composition has contacted.

The present invention relates to a thermosetting organic resin composition comprising (A) 100 parts by weight of a thermosetting organic resin and (B) 0.01 to 100 parts by weight of a thiocyanato-containing organohydrocarbonoxysilane or an isothiocyanato-containing organohydrocarbonoxysilane represented by the general formula: $X—R^1—Si(OR^2)nR^3_{3-n}$ (wherein X is NCS— or SCN—, $R^1$ is an alkylene or alkyleneoxyalkylene group, $R^2$ and $R^3$ are monovalent hydrocarbon groups, and the subscript n is 1, 2, or 3).

To further explain the above, there are no particular limitations with regard to the type etc. of the thermosetting organic resin (A) so long as the thermosetting organic resin is liquid or solid at normal temperatures and cures under heating.

Epoxy resins, phenolic resins, formaldehyde resins, xylene resins, xylene-formaldehyde resins, ketone-formaldehyde resins, furan resins, urea resins, imide resins, melamine resins, alkyd resins, unsaturated polyester resins, aniline resins, sulfonamide resins, and silicone resins are exemplified as such thermosetting organic resins. Of the above, epoxy resins, phenolic resins, and imide resins are preferable.

Component (B) constitutes an essential characteristic of the composition of the present invention and acts to improve molding properties of the composition of the present invention and its adhesive properties on substrates such as metals. Component (B) is a thiocyanato-containing organohydrocarbonoxysilane or an isothiocyanato-containing organohydrocarbonoxysilane represented by the general formula: $X—R^1—Si(OR^2)nR^3_{3-n}$ (wherein X is NCS— or SCN—, $R^1$ is an alkylene or alkyleneoxyalkylene group, $R^2$ and $R^3$ are monovalent hydrocarbon groups, and the subscript n is 1, 2, or 3).

In the formula above, the alkylene group of $R^1$ is exemplified by methylene, ethylene, methylmethylene, propylene, methylethylene, and butylene. The alkyleneoxyalkylene group of $R^1$ is exemplified by methylenoxymethylene, methylenoxyethylene, ethylenoxyethylene, and ethylenoxypropylene. $R^1$ is preferably an alkylene group. The monovalent hydrocarbon groups of $R^2$ and $R^5$ are exemplified by methyl, ethyl, n-propyl, i-propyl and other alkyl groups; vinyl, allyl, butenyl and other alkenyl groups; and by phenyl, tolyl, xylyl, and other aryl groups. $R^2$ and $R^5$ are preferably alkyl groups. The subscript n is 1, 2, or 3, preferably, 2 and 3.

The thiocyanato-containing organohydrocarbonoxysilanes, or isothiocyanato-containing organohydrocarbonoxysilanes of Component (B) are exemplified by the following compounds.

$NCS(CH_2)_3Si(OCH_3)_3$
$NCS(CH_2)_3Si(OCH_2CH_3)_3$
$NCS(CH_2)_3Si[OCH(CH_2)_3]_3$
$NCS(CH_2)_3Si[O(CH_2)_2CH_3]_3$
$NCS(CH_2)_3Si[O(CH_2)_3CH_3]_3$
$NCSCH_2CH(CH_3)CH_2Si(OCH_3)_3$
$NCSCH_2CH(CH_3)CH_2Si(OCH_2CH_3)_3$
$SCN(CH_2)_3Si(OCH_3)_3$
$SCN(CH_2)_3Si(OCH_2CH_3)_3$
$SCN(CH_2)_3Si[OCH(CH_3)_2]_3$
$SCNCH_2CH(CH_3)CH_2Si(OCH_3)_3$
$SCNCH_2CH(CH_3)CH_2Si(OCH_2CH_3)_3$
$SCNCH_2CH(CH_3)CH_2Si[OCH(CH_3)_2]_3$
$SCNCH_2CH(CH_3)CH_2Si(O(CH_2)_3CH_3)_3$
$NCS(CH_2)_3SiCH_3(OCH_3)_2$
$NCS(CH_2)_3SiCH_3(OCH_2CH_3)_2$
$NCS(CH_2)_3Si(OC_6H_5)_3$
$NCSCH_2CH(CH_3)CH_2SiCH_3(OCH_3)_3$

Two or more kinds of Component (3) can be added to the composition. If the amount of Component (B) added to the composition is too small, its adhesive properties on substrates such as metals deteriorate, and if it is too large, its mechanical strength decreases. For this reason, it should be in the range of 0.01 to 100 parts by weight, and, preferably, in the range of 0.1 to 50 parts by weight, per 100 parts by weight of Component (A).

Although the composition of the present invention comprises the above-mentioned Component (A) and Component (B), in addition to these components, various additives known to be compounded with Component (A), for instance, curing agents or cure promoters used to promote the cure of Component (A), fillers, plasticizers, flexibilizers, pigments, heat-stabilizers, flame-retarding agents, antioxidants, photo-sensitizers, organic solvents etc. can be combined therewith.

Some examples of the curing agents or cure promoters include primary or secondary amine compounds, tertiary amine compounds; phtharic anhyride, tetrahydrophtharic anhydride, and other carboxylic acid anhydrides; imidazole compounds; phenolnovlak resin, cresolnovlak resin, and other novlak resins; organoaluminum compounds, organozirconium compounds, and other organometallic compounds; phosphine and other organic phosphorus compounds; boron complex compounds, organic ammonium salts, organic sulfonium salts, organic peroxides, etc.

The curing agents are added preferably in an amount of 0.1 to 30 parts by weight per 100 parts by weight of Component (A), but novlak resins for curing epoxy resins are added preferably in an amount of 10 to 400 parts by weight per 100 parts by weight of epoxy resins, and the cure promoters are added preferably in an amount of 0.01 to 10 parts by weight per 100 parts by weight of Component (A).

The fillers are exemplified by glass fibers, asbestos, alumina fibers, ceramic fibers containing alumina and silica, boron fibers, zirconia fibers, silicon carbide fibers, metal fibers, polyester fibers, aramide fibers, Nylon fibers, phenolic fibers, natural plant and animal fibers and other fibrous fillers; fused silica, precipitated silica, fumed silica, calcined silica, zinc oxide, calcined clay, carbon black, glass beads, alumina, talc, calcium carbonate, clay, aluminum hydroxide, barium sulfate, titanium dioxide, aluminum nitride, silicon carbide, magnesium oxide, beryllium oxide, kaolin, mica, zirconia, and other powdery fillers.

The fillers are added preferably in an amount of 10 to 500 parts by weight per 100 parts by weight of Component (A) in non-liquid curable organic resin compositions, and in an amount of 0 to 50 parts by weight per 100 parts by weight of Component (A) in liquid curable organic resin compositions.

Plasticizers and flexibilizers are exemplified by metal salts of higher fatty acids, ester waxes, silicone oils, silicone oils containing organic functional groups, silicone rubbers, and organic rubbers.

The composition of the present invention comprises the above-described Component (A) and Component (B) and can be easily prepared by uniformly mixing them with the above-described additives, if necessary. Some examples of equipment used to prepare the composition of the present invention include continuous mixer-extruders, Ross mixers, kneader-mixers, twin roll mills, etc. In addition, conventional publicly known methods recognized as molding methods suitable for Component (A), such as, for instance, compression molding, transfer molding, injection molding, potting, casting, coating, etc., can be utilized in the manufacture of moldings from the composition of the present invention.

The composition of the present invention as described above possesses superior molding properties and, when cured, superior adhesive properties on substrates such as metals with which said composition has contacted. Nickel, copper, brass, iron, steel, stainless steel, aluminum, duralumin, titanium, and silver are exemplified as the metals, and glass, ceramics, stones, and semiconductors are exemplified as the substrates. By exploiting the advantages of such properties, it may prove useful, for instance, for sealing agents, packaging agents, coating agents, adhesive agents etc. used in electric and electronic components or devices, machines, buildings, automobiles etc.

EXAMPLES

The composition of the present invention is explained in detail below by referring to working examples. The term "viscosity," as used in the working examples and comparative examples, refers to values obtained at 25° C. In addition, the moldability, adhesion (adhesive properties), and viscosity change rate of the thermosetting organic resin composition were evaluated in accordance with the following methods.

Moldability

The moldability of the thermosetting organic resin composition under pressure was evaluated by measuring its spiral flow. The spiral flow was measured by a test based on an EMMI standard (EMMI-1-66).

Adhesion (A)

An adhesion test piece made up of nickel plates integrally bonded with a cured product of the thermosetting organic resin composition was fabricated by sandwiching the thermosetting organic resin composition between two nickel plates (length: 5 cm, width: 1 cm, thickness: 0.5 mm) and conducting compression molding at a specified temperature and specified pressure. The edges of the two nickel plates of the test piece were respectively secured in the jig of a tensile tester and pulled away in a perpendicular direction at a speed of 50 mm/minutes, peeling apart the nickel plates and the cured product of the thermosetting organic resin composition.

Subsequently, the condition of the fracture surface between the cured product of the thermosetting organic resin composition and the nickel plates was subjected to visual examination. The results were designated in the following manner.

◎: Extremely good adhesion (Fracture occurred in the layer of the cured organic resin. Cohesive failure: 100%).

○: Good adhesion (Partial interface peeling occurred. Cohesive failure: 95% or more).

x: Poor adhesion (Peeling occurred at the interface between the cured thermosetting organic resin and the nickel plates. Cohesive failure: 50% or less)

Adhesion (B)

An adhesion test piece made up of nickel plates integrally bonded with a cured product of the curable organic resin composition was fabricated by sandwiching the curable organic resin composition between two nickel plates (length: 5 cm, width: 1 cm, thickness: 0.5 mm) and conducting compression molding at a specified temperature and specified pressure. In addition, adhesion test pieces made up of copper plates integrally bonded with a cured product of the curable organic resin composition were fabricated in the same manner as above.

The edges of the two nickel plates or the two copper plates of these test pieces were respectively secured in the jig of a tensile tester and pulled away in a perpendicular direction at a speed of 50 mm/minutes, peeling apart the nickel plates or the copper plates and the cured product of the organic resin composition. The stress required for peeling was measured and used as the adhesive strength (kgf/cm$^2$).

Viscosity Change Rate:

After preparation, the thermosetting organic resin composition was allowed to stand at 23° C. for 24 hours. The degree of increase in its viscosity was measured and used as the viscosity change rate. Viscosity change rate=(viscosity of the thermosetting organic resin composition on standing for 24 hours−viscosity of the curable organic resin composition immediately after preparation)×10/viscosity of the thermosetting organic resin composition immediately after preparation.

Working Example 1

A curable phenolic resin composition was prepared by kneading 35 parts by weight of phenolic resin (phenol-novolak resin Mirex XLC-3L from Mitsui Chemicals, Inc., softening point: 70° C., hydroxyl equivalent weight: 170), 3 parts by weight of 3-thiocyanatopropyltrimethoxysilane{NCS(CH$_2$)$_3$Si(OCH$_3$)$_3$}, 65 parts by weight of fused silica powder, 4 parts by weight of hexamethylenetetramine, and 1 part by weight of carnauba wax using a heating roller at 90° C.

The composition was finely powdered and the powdered material was sandwiched between two nickel plates (length: 5 cm, width: 1 cm, thickness: 0.5 mm) and subjected to compression molding by heating it for 3 minutes at a temperature of 175° C. and a pressure of 70 kg/cm$^2$. After that, in order to complete the cure, the composition was heated for 2 hours at 180° C., producing an adhesion test piece made up of nickel plates integrally bonded with a cured product of phenolic resin. Using the test piece, the adhesion of the thermosetting organic resin composition to the nickel plates was measured in accordance with the method described in Adhesion (A) above, and the results were listed in Table 1.

Comparative Example 1

A phenol-novolak resin composition was prepared in the same manner as in Working Example 1, except that 3-glycidoxypropyltrimethoxysilane was added instead of the 3-thiocyanatopropyltrimethoxysilane used in Working Example 1. The adhesion of the composition to the nickel plates was measured in the same manner as in Working Example 1, and the results were listed in Table 1.

Comparative Example 2

A phenol-novolak resin composition was prepared in the same manner as in Working Example 1, except that the 3-thiocyanatopropyltrimethoxysilane of Working Example 1 was not used. The adhesion of the composition to the nickel plates was measured in the same manner as in Working Example 1, and the results were listed in Table 1.

TABLE 1

| Item Measured | Working Example 1 | Comparative Example 1 | Comparative Example 2 |
| --- | --- | --- | --- |
| Adhesion (A) | ◎ | X | X |

Working Example 2

A thermosetting silicone-epoxy resin composition was prepared by kneading 13 parts by weight of methylphenylpolysiloxane resin consisting of 40 mol % of CH$_3$SiO$_{3/2}$ units, 10 mol % of C$_6$H$_5$(CH$_3$)SiO$_{2/2}$ units, 40 mol % of C$_6$H$_5$SiO$_{3/2}$ units, and 10 mol % of (C$_6$H$_5$)$_2$SiO$_{2/2}$ units and containing 5 wt % of hydroxyl groups directly bonded to silicon atoms, 13 parts by weight of orthocresol-novolak epoxy resin (EOCN-1020 from Nippon Kayaku Co., Ltd., softening point: 80° C., epoxy equivalent: 220), 2 parts by weight of 3-thiocyanatopropylmethyldimethoxysilane {NCS(CH$_2$)$_3$SiCH$_3$(OCH$_3$)$_2$}, 74 parts by weight of fused silica powder, 0.90 parts by weight of aluminum acetylacetonate, and 1 part by weight of carnauba wax using a heating roller at 90° C.

The spiral flow of the thermosetting epoxy resin composition was measured. Next, the thermosetting resin composition was sandwiched between two nickel plates (length: 5 cm, width: 1 cm, thickness: 0.5 mm), and subjected to compression molding by heating it for 2 minutes at a temperature of 175° C. and a pressure of 70 kg/cm$^2$. After that, in order to complete the cure, the composition was heated for 12 hours at 180° C., producing an adhesion test piece made up of nickel plates integrally bonded with a cured product of the curable organic resin composition. Using the test piece, the adhesion of the curable organic resin composition to the nickel plates was measured in accordance with the method described in Adhesion (A) above, and the results were listed in Table 2.

Working Example 3

A thermosetting epoxy resin composition was prepared in the same manner as in Working Example 2, except that 3-isothiocyanatopropylmethyltrimethoxysilane {SCN(CH$_2$)$_3$Si(OCH$_3$)$_3$} was added instead of the 3-thiocyanatopropylmethyldimethoxysilane used in Working Example 2. The spiral flow of the composition and its adhesion to the nickel plates were measured in the same manner as in Working Example 2, and the results were listed in Comparative Example 3

A thermosetting epoxy resin composition was prepared in the same manner as in Working Example 2, except that 3-mercaptopropyltrimethoxysilane {HS(CH$_2$)$_3$Si(OCH$_3$)$_3$} was added instead of the 3-thiocyanatopropylmethyldimethoxysilane used in Working Example 2. The spiral flow of the composition and its adhesion to the nickel plates were measured in accordance with the method described in Adhesion (A) above, and the results were listed in Table 2.

Comparative Example 4

A thermosetting epoxy resin composition was prepared in the same manner as in Working Example 2, except that the 3-thiocyanatopropylmethyldimethoxysilane used in Working Example 2 was not added. The spiral flow of the composition and its adhesion to the nickel plates were measured in the same manner as in Working Example 2, and the results were listed in Table 2.

TABLE 2

| Item Measured | Working Example 2 | Working Example 3 | Comparative Example 3 | Comparative Example 4 |
| --- | --- | --- | --- | --- |
| Spiral flow (in.) | 42 | 39 | 21 | 13 |
| Adhesion (A) | ◎ | ○ | ○ | X |

Working Example 4

A thermosetting polyimide resin composition was prepared by kneading 35 parts by weight of bismaleimidetriazine-type thermosetting polyimide resin (from Mitsubishi Gas Chemical Co., Ltd.), 4 parts by weight of 3-thiocyanatopropyltrimethoxysilane $\{NCS(CH_2)_3Si(OCH_3)_3\}$, 65 parts by weight of fused silica powder, 1 part by weight of carnauba wax, and 0.32 parts by weight of aluminum benzoate using a heating roller at 90° C. The spiral flow of the composition was measured.

Subsequently, the composition was sandwiched between two nickel plates (length: 5 cm, width: 1 cm, thickness: 0.5 mm) and subjected to compression molding by heating it for 4 minutes at a temperature of 220° C. and a pressure of 70 kg/cm². After that, in order to complete the cure, the composition was heated for 3 hours at 230° C., producing an adhesion test piece made up of nickel plates integrally bonded with a cured product of the thermosetting polyimide resin composition.

Using the test piece, the adhesion of the thermosetting polyimide resin composition to the nickel plates was measured in accordance with the method described in Adhesion (A) above, and the results were listed in Table 3.

Comparative Example 5

A thermosetting polyimide resin composition was prepared in the same manner as in Working Example 4, except that the 3-thiocyanatopropyltrimethoxysilane used in Working Example 4 was not added. The spiral flow of the composition and its adhesion to the nickel plates were measured in the same manner as in Working Example 4, and the results were listed in Table 3.

TABLE 3

| Item Measured | Working Example 4 | Comparative Example 5 |
|---|---|---|
| Spiral flow (in.) | 52 | 43 |
| Adhesion (A) | ◎ | X |

Working Example 5

A thermosetting epoxy resin composition was prepared by kneading 75 parts by weight of orthocresol-novolak epoxy resin (EOCN-1020 from Nippon Kayaku Co., Ltd., softening point: 80° C., epoxy equivalent: 220), 260 parts by weight of fused silica, 1 part by weight of carnauba wax, 35 parts by weight of phenol-novolak resin (Rex XLC-3L from Mitsui Chemicals, Inc., softening point: 70° C., hydroxyl equivalent weight: 170), 0.6 parts by weight of triphenylphosphine, and 5 parts by weight of 3-thiocyanatopropyltrimethoxysilane $\{NCS(CH_2)_3Si(OCH_3)_3\}$ using a heating roller at 90° C.

The spiral flow of the composition was measured. Subsequently, the composition was sandwiched between two nickel plates (length: 5 cm, width: 1 cm, thickness: 0.5 mm), and subjected to compression molding by heating it for 3 minutes at a temperature of 150° C. and a pressure of 70 kg/cm². After that, in order to complete the cure, the composition was heated for 4 hours at 180° C., producing an adhesion test piece made up of nickel plates integrally bonded with a cured product of the thermosetting epoxy resin composition. Using the test piece, the adhesion of the thermosetting epoxy resin composition to the nickel plates was measured in accordance with the method described in Adhesion (A) above, and the results were listed in Table 4.

Comparative Example 6

A thermosetting epoxy resin composition was prepared in the same manner as in Working Example 5, except that 3-glycidoxypropyltrimethoxysilane was added instead of the 3-thiocyanatopropyltrimethoxysilane used in Working Example 5. The spiral flow of the composition and its adhesion to the nickel plates were measured in accordance with the method described in Adhesion (A) above, and the results were listed in Table 4.

Comparative Example 7

A thermosetting epoxy resin composition was prepared in the same manner as in Working Example 5, except that the 3-thiocyanatopropyltrimethoxysilane used in Working Example 5 was not added. The spiral flow of the composition and its adhesion to the nickel plates were measured in accordance with the method described in Adhesion (A) above, and the results were listed in Table 4.

TABLE 4

| Item Measured | Working Example 5 | Comparative Example 6 | Comparative Example 7 |
|---|---|---|---|
| Spiral flow (in.) | 55 | 53 | 52 |
| Adhesion (A) | ◎ | X | X |

Working Example 6

A thermosetting liquid epoxy resin composition was prepared by thoroughly mixing 20 parts by weight of a liquid epoxy resin (ERL-4221 from Union Carbide), 22 parts by weight of liquid acid anhydride (3- and 4-methylhexahydrophthalic anhydride), 0.3 parts by weight of tin octylate, and 2 parts by weight of 3-thiocyanatopropyltrimethoxysilane $\{NCS(CH_2)_3Si(OCH_3)_3\}$ at room temperature and de-foaming the mixture. The viscosity change rate of the composition was measured.

Subsequently, the composition was sandwiched between two nickel plates or two copper plates (length: 5 cm, width: 1 cm, thickness: 0.5 mm), and subjected to compression molding by heating it for 3 minutes at a temperature of 120° C. and a pressure of 70 kg/cm². After that, in order to complete the cure, the composition was heated for 3 hours at 150° C., producing an adhesion test piece made up of nickel plates or copper plates integrally bonded with a cured product of the thermosetting epoxy resin composition. Using the test piece, its adhesion was measured in accordance with the method described in Adhesion (B) above, and the results were listed in Table 5.

Comparative Example 8

A thermosetting liquid epoxy resin composition was prepared in the same manner as in Working Example 6, except that 3-mercaptopropyltrimethoxysilane was added instead of the 3-thiocyanatopropyltrimethoxysilane used in Working Example 6. The viscosity change rate and adhesion of the composition were measured in accordance with the method described in Adhesion (B) above, and the results were listed in Table 5.

Comparative Example 9

A thermosetting liquid epoxy resin composition was prepared in the same manner as in Working Example 6, except that 3-glycidoxypropyltrimethoxysilane was added instead of the 3-thiocyanatopropyltrimethoxysilane used in Working Example 6. The viscosity change rate and adhesion of the composition were measured in accordance with the method described in Adhesion (B) above, and the results were listed in Table 5.

Comparative Example 10

A thermosetting epoxy resin composition was prepared in the same manner as in Working Example 6, except that 3-thiocyanatopropyltrimethoxysilane used in Working Example 6 was not added. The composition was cured in the same manner as in Working Example 6. The viscosity change rate and adhesion of the composition were measured in accordance with the method described in Adhesion (B) above, and the results were listed in Table 5.

TABLE 5

| Item Measured | Working Example 6 | Comparative Example 8 | Comparative Example 9 | Comparative Example 10 |
|---|---|---|---|---|
| Viscosity change rate | 2 | Could not be measured (gelling occurred) | 13 | 4 |
| Adhesion(B) (kg/cm$^2$) | | | | |
| Nickel plates | 182 | 85 | 62 | 59 |
| Copper plates | 121 | 89 | 52 | 53 |

Because the thermosetting organic resin composition of the present invention comprises 100 parts by weight of Component (A) and 0.01 to 100 parts by weight of Component (B), i.e. the thiocyanato-containing organohydrocarbonoxysilane or isothiocyanato-containing organohydrocarbonoxysilane represented by the general formula: $X-R^1-Si(OR^2)nR^3_{3-n}$ (wherein X is NCS— or SCN—, $R^1$ is an alkylene or alkyleneoxyalkylene group, $R^2$ and $R^3$ are monovalent hydrocarbon groups, and the subscript n is 1, 2, or 3), it possesses superior moldability and, when cured, exhibits superior adhesive properties on substrates such as metals with which said thermosetting organic resin composition has contacted.

The invention claimed is:

1. A thermosetting organic resin composition comprising:
   (A) 100 parts by weight of a thermosetting organic resin selected from the group of epoxy resins, phenolic resins, formaldehyde resins, xylene resins, xylene-formaldehyde resins, ketone-formaldehyde resins, furan resins, urea resins, imide resins, melamine resins, alkyd resins, unsaturated polyester resins, aniline resins, sulfonamide resins, and hydrogen-functional methylphenylpolysiloxane resin, and (B) 0.01 to 100 parts by weight of a thiocyanato-containing organohydrocarbonoxysilane or an isothiocyanato-containing organohydrocarbonoxysilane represented by the general formula: $X-R^1-Si(OR^2)_nR^3_{3-n}$ wherein X is NCS— or SCN—, $R^1$ is an alkylene or alkyleneoxyalkylene group, $R^2$ and $R^3$ are monovalent hydrocarbon groups, and the subscript n is 1, 2, or 3.

2. The thermosetting organic resin composition according to claim 1, wherein the thermosetting organic resin is selected from the group of an epoxy resin, phenolic resin and imide resin.

3. The thermosetting organic resin composition according to claim 2, wherein $R^1$ is an alkylene group, $R^2$ and $R^3$ are alkyl groups, Component (B) has the formula $X-R^1-Si(OR^2)_nR^3_{3-n}$ and n has a value of 2 or 3.

4. The thermosetting organic resin composition according to claim 3, wherein Component (B) is 3-thiocyanatopropyltrimethoxysilane, 3-thiocyanatopropylmethyldimethoxysilane or 3-isothiocyanatopropyltrimethoxysilane.

5. The thermosetting organic resin composition according to claim 1, wherein $R^1$ is an alkylene group, $R^2$ and $R^3$ are alkyl groups, Component (B) has the formula $X-R^1-Si(OR^2)_nR^3_{3-n}$ and n has a value of 2 or 3.

6. The thermosetting organic resin composition according to claim 5, wherein Component (B) is 3-thiocyanatopropyltrimethoxysilane, 3-thiocyanatopropylmethyldimethoxysilane or 3-isothiocyanatopropyltrimethoxysilane.

7. The thermosetting organic resin composition according to claim 1, wherein Component (B) is 3-thiocyanatopropyltrimethoxysilane, 3-thiocyanatopropylmethyldimethoxysilane or 3-isothiocyanatopropyltrimethoxysilane.

8. The thermosetting organic resin composition according to claim 1 wherein $R^1$ is selected from the group of methylene, ethylene, methylmethylene, propylene, methylethylene, and butylene.

9. The thermosetting organic resin composition according to claim 8 wherein $R^2$ and $R^3$ are selected from the group of methyl, ethyl, n-propyl, i-propyl, vinyl, allyl, butenyl, phenyl, tolyl, xylyl, and combinations thereof.

10. The thermosetting organic resin composition according to claim 1 further comprising a filler.

11. The thermosetting organic resin composition according to claim 10 further defined as a non-liquid thermosetting organic resin composition.

12. The thermosetting organic resin composition according to claim 10 wherein said filler is present in an amount of from 10 to 500 parts by weight per 100 parts by weight of Component (A).

13. An article comprising a substrate and a cured product of said thermosetting organic resin composition according to claim 1 in contact therewith.

14. An article as set forth in claim 13 wherein said cured product is sandwiched between two substrates.

15. An article as set forth in claim 13 wherein said substrate comprises metal.

16. An article as set forth in claim 13 wherein said substrate comprises a material selected from the group of glass, ceramics, stones, and semiconductors.

* * * * *